(No Model.)
C. DORNBUSCH.
RECORDING WEIGHING SCALE.
No. 393,299. Patented Nov. 20, 1888.
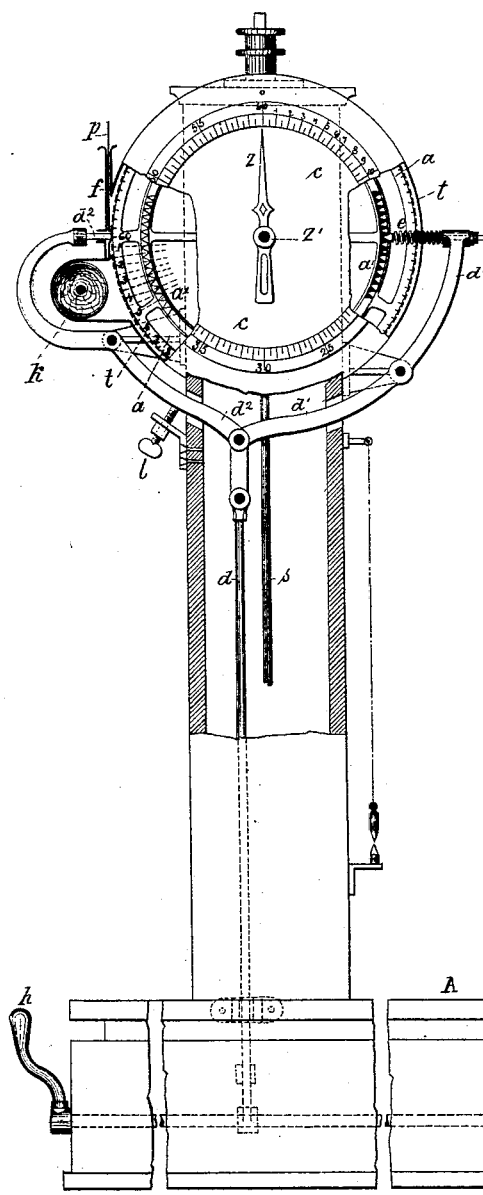
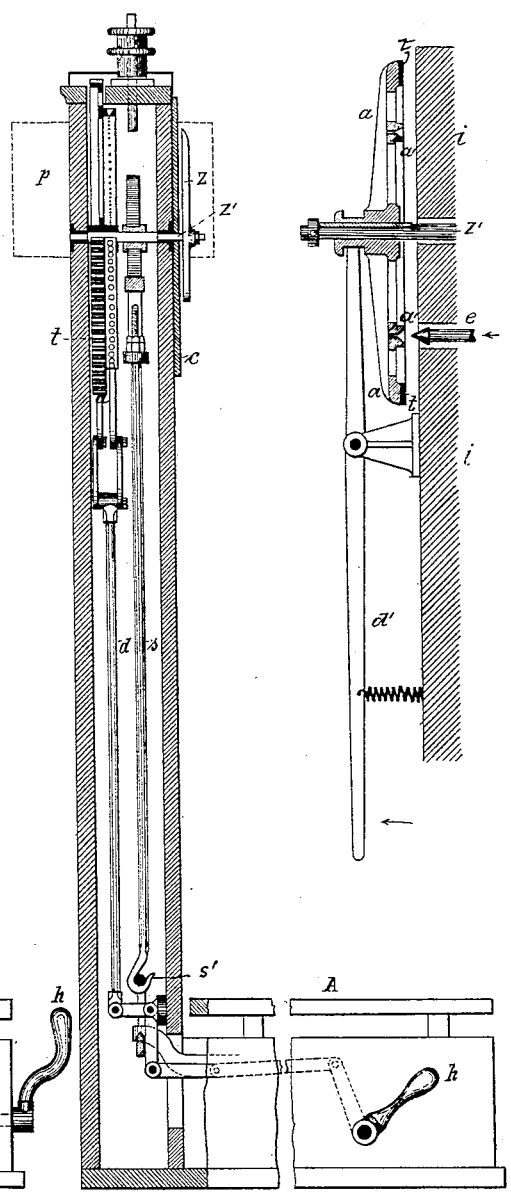
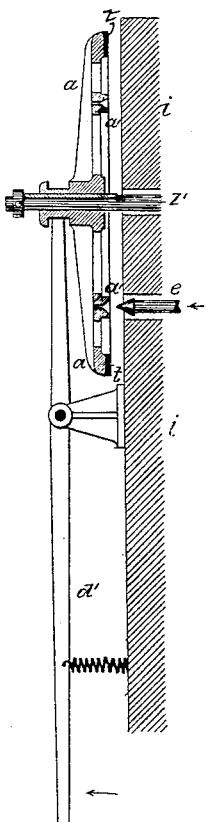
Witnesses
Inventor
Carl Dornbusch
By Singerslbner,
Attorneys

UNITED STATES PATENT OFFICE.

CARL DORNBUSCH, OF SCHLOTTWITZ, SAXONY, GERMANY.

RECORDING WEIGHING-SCALE.

SPECIFICATION forming part of Letters Patent No. 393,299, dated November 20, 1888.

Application filed March 26, 1887. Renewed October 26, 1888. Serial No. 289,241. (No model.)

*To all whom it may concern:*

Be it known that I, CARL DORNBUSCH, a subject of the King of Saxony, Germany, and a resident of Schlottwitz, Saxony, Germany, have invented a new and useful Improvement in a Printing Device for Scales, of which the following is a clear and exact description, reference being had to the accompanying drawings, forming a part of this specification.

In scales employed to weigh mail-matter and small packages there was lacking hitherto a device to show in written characters the ascertained weight as the same is shown by mechanical shifting of weights in decimal and centesimal scales of modern make.

My invention therefore has for its object to provide weighing and gaging scales with automatic marking mechanism, illustrated in the accompanying drawings, in which—

Figure 1 is a front view, Fig. 2 a sectional side view, and Fig. 3 a modification, of my marking device.

The mechanism, as seen, consists in a wheel, $a$, with furrowed tire $a'$, turning upon an arbor, $z'$, turned by the drawing-rod $s$, and being provided either on its rim, Figs. 1 and 2, or on its face or flat side, Fig. 3, with printing-types $t$, the arrangement of which latter corresponds with that of the dial $c$. A pressure-lever, $d$, operatively attached to the scale-frame, brings a paper slip, label, or addressed card of the package $p$ against the types $t$ previously colored, when required, thus imprinting said paper with the marks of the weight indicated. This lever $d$, operated by the handles of crank $h\ h$, to which latter the rod $s$ is hooked at $s'$, has two arms, $d'\ d^2$, of which the former is provided with a spring-point, $e$, and the latter carries the holder $f$ of paper slip $p$.

The scale, when at rest, (the drawing-rod $s$, operating by means of a pinion and rack, being free of the weight on the plate A,) has the index-finger $z$ on the arbor $z'$ to the left of the zero, which brings the first type underneath the lever-arm $d^2$. Pressing now upon the crank-handle $h$, so as to start the working of the scale, the index-finger $z$ points to zero or the starting-point, (marked in Fig. 1 by the number 60,) and at the same time the type 60 is found opposite the lever-arm $d^2$.

Having now placed the matter to be weighed upon the scale, we push the handle $h$ farther down, when the spring-point $e$ of the lever-arm $d'$ is made to enter the furrows or notches of the tire $a'$ of corresponding arrangement with the dial-face, thereby fixing the type-wheel $a$. Exerting next still further pressure upon the handle $h$, the lever-arm $d^2$ is made to bring the paper slip or card $p$, fixed in holder $f$, against the type-wheel $a$, imprinting the marks of the latter thereon. Underneath the lever-arm $d^2$ and in contact with type-wheel $a$ there is employed a coloring-roller, $k$, to produce, when required, by means of various colored inks, variegated impressions of the types, while the screw $l$, attached to the scale-frame and working upon the lever $d$, serves to regulate the depth of the impressions to be made upon the paper slips or card, according to their strength and the material of which they are made.

Fig. 3 shows a modification of my marking device, in which the types are applied to the face or flat side of the wheel $a$, which can be slid upon the arbor $z'$ by means of the lever $d$, attached to arbor $z'$. The point $e$ of lever-arm $d'$ passes into the face deepenings or furrows of the tire $a'$, and the type $t$ is imprinted by pressure of the lever-arm $d^2$ upon the paper placed between the wheel $a$ and the plate $i$.

Having now described my invention, I desire to claim—

In a marker-scale, the type-wheel $a$, having the furrowed tire $a'$, in combination with the dial $c$, the arbor $z'$, provided with index-finger $z$, the lever $d$, having the arms $d'\ d^2$, the spring-point $e$, the card-holder $f$, the drawing-rod $s$, the crank $h\ h$, the screw $l$, and the coloring-roller $k$, substantially as and for the purpose set forth.

In witness whereof I hereunto set my hand in presence of two witnesses.

CARL DORNB[...]

Witnesses:
 RUDOLF SCHMIDT,
 PAUL DRUCKMÜLLER.